United States Patent [19]
Gurtler et al.

[11] 3,858,150
[45] Dec. 31, 1974

[54] POLYCRYSTALLINE SILICON PRESSURE SENSOR

[75] Inventors: Richard Warren Gurtler, Mesa; Ross Wayne Zwernemann, Tempe, both of Ariz.

[73] Assignee: Motorola, Inc., Chicago, Ill.

[22] Filed: June 21, 1973

[21] Appl. No.: 372,453

[52] U.S. Cl. .............. 338/2, 29/580, 73/88.5 SD
[51] Int. Cl. .............................................. G01l 1/22
[58] Field of Search ............................. 338/2–5; 73/88.5 R, 88.5 SD; 29/580, 610, 620; 317/235 H

[56] References Cited
UNITED STATES PATENTS

| | | | |
|---|---|---|---|
| 3,230,763 | 1/1966 | Frantzis | 73/88.5 SD X |
| 3,513,430 | 5/1970 | Heller | 338/4 |
| 3,739,315 | 6/1973 | Kurtz | 338/3 |
| 3,753,196 | 8/1973 | Kurtz | 338/4 |

Primary Examiner—C. L. Albritton
Attorney, Agent, or Firm—Vincent J. Rauner; Kenneth R. Stevens

[57] ABSTRACT

A piezoresistive pressure sensor is formed in a polycrystalline silicon layer. The polycrystalline silicon layer is deposited on an insulating etch stop layer of silicon nitride which in turn is deposited over a substrate of monocrystalline silicon, cut along the [110] or [100] crystallographic plane. The substrate is configured to support the silicon nitride layer by etching away its inner section and leaving a peripheral section that is thick compared to the silicon nitride layer. Pressure insensitive elements may be formed over the peripheral section and electrically connected to one or more pressure sensitive elements to form an electrical bridge circuit which produces an imbalance current when pressure is applied.

Another embodiment of the invention involves the use of a boron, P+ conductivity type region as an etch stop, replacing the silicon nitride layer.

11 Claims, 6 Drawing Figures

POLYCRYSTALLINE SILICON PRESSURE SENSOR

BACKGROUND OF THE INVENTION

1. Field of the Invention

This invention pertains to transducers used to transform mechanical motion or stress into changes in electrical current representative of the amplitude of the mechanical motion or stress. More specifically, this invention relates to polycrystalline silicon material which changes resistance in response to a mechanical deformation. When the transducer is an element in a balanced bridge circuit, a change in resistance imbalances the bridge resulting in an output indicative of the mechanical motion where stressed that cause the change in resistance.

2. Description of the Prior Art

The physics of piezoresistive semiconductive material is well documented in the prior art, with the exception of the characteristics of polycrystalline silicon. For example, monocrystalline silicon has been extensively tested. A meaningful measure of the ability of the selected material to change resistance in response to a mechanical force is known as the "gage factor". The gage factor is defined as the fractional change in resistance per unit strain. It is mathematically defined as follows:

$$GF = dR/R_0/dL/L_0$$

wherein:
$R_0$ is the initial resistance
$L_0$ is the initial length
$dR$ is the change in electrical resistance
$dL$ is the change in length Wire strain gages were very common prior to the discovery of properties of piezoresistive semiconductive material. Wire strain gages showed negligible conductivity modulation because of applied forces. Nevertheless, they have been the cornerstone of the strain gage technology over the years. The sensitivity exhibited by wire strain gages is much smaller than that of piezoresistive silicon, for example. Piezoresistive silicon may be many orders of magnitude more sensitive than wire strain gages. The use of N conductivity type polycrystalline silicon results in a gage factor that is quite high compared to many of the other piezoresistive silicon combinations. The following table sets out the gage factor for the various types of semiconductor material.

TABLE I

| MATERIAL | CARRIER TYPE | ORIENTATION | GF |
|---|---|---|---|
| Si | P | 111 | 175 |
| Si | N | 111 | − 5 |
| Si | N | 100 | −133 |
| Si | P | 100 | 5 |
| Si | P | 110 | 120 |
| Si | N | 110 | − 55 |
| Ge | N | 111 | −157 |
| Ge | P | 111 | 102 |
| InSb | P | 100 | − 45 |
| InSb | N | 100 | − 74 |
| Si | N | Poly | 100 |

The maximum gage factor occurs in the [111] direction of P type silicon of resistivity greater than 1.0 ohm centimeter. Although greater than the gage factor of the N doped polysilicon, polysilicon has obvious advantages that prove useful in a given application. For example, the use of polycrystalline silicon results in a much simpler fabrication technique because polysilicon can be deposited directly over $SiO_2$ or $SiN_3$, an obvious advantage if the reduction in gage factor can be tolerated.

BRIEF SUMMARY OF THE INVENTION

A monocrystalline silicon wafer cut along the [110] crystallographic plane is used as the substrate support member of this invention. In the preferred embodiment, a silicon nitride layer is deposited over the top surface of the wafer resulting in a layer of an insulating, etch stop material. On top of the silicon nitride layer is deposited a layer of N conductivity type polycrystalline silicon. Boron is diffused into the polycrystalline silicon layer from its top surface to form a piezoresistive pressure sensitive element. Of course, ion implantation techniques could be used instead of diffusion.

For the fabrication technique utilized in this invention, monocrystalline silicon cut along the [111] crystallographic plane is eliminated for use as the substrate support member. Since the etching is done with potassium hydroxide (KOH), silicon cut along the [110] or [100] is used because they both are readily and controllably etched by KOH. Material cut along the [111] crystallographic plane does not lend itself to KOH etching.

The selection of impurity to form the piezoresistive elements is then governed by the applications to which the sensor is to be put. In the preferred embodiment, the gage factor has been empirically determined and is satisfactory for use in an environment having a wide temperature range. If the gage factor is deleteriously affected by an extremely high temperature, many well known compensation techniques are available to correct resultant errors.

A selective KOH etch is performed from the other side of the wafer and is stopped by the silicon nitride layer to provide a flexible inner section comprised of the silicon nitride layer and that portion of the polycrystalline silicon layer that is over only the flexible section. A peripheral section of the monocrystalline silicon substrate is left, the peripheral section being much thicker than the flexible section and serving to support the flexible section. The piezoresistive pressure sensitive element metnioned above is formed in the flexible section of the device. Another pressure sensitive element may be formed in the flexible section and a pair of pressure insensitive elements may be formed in the peripheral section, with appropriate electrical connections being made to form a known balanced bridge circuit. When the pressure sensitive elements are deflected by an outside pressure, their resistance changes and the bridge circuit produces an output representative of the resistance change and therefore of the amount of pressure applied.

It is a primary object of this invention to provide a pressure sensor having a relatively thin flexible inner section and a relatively thick peripheral section, the peripheral section supporting the ends of a piezoresistive pressure sensitive element, and a method of manufacturing the sensor.

It is another object of this invention to provide a silicon pressure sensor having a pair of piezoresistive pressure sensitive elements of a bridge circuit formed within a polycrystalline silicon at a flexible section with the ends supported by a monocrystalline silicon substrate supporting member, and further having a pair of pressure insensitive elements of the bridge circuit formed within the polycrystalline silicon over the peripheral section and appropriately connected to the pressure sensitive elements to form the bridge.

It is still another object of this invention to provide a method of reliably and cheaply manufacturing a silicon pressure sensor having a relatively high gage factor.

These and other objects will be made more evident in the detailed description that follows.

DETAILED DESCRIPTION OF THE INVENTION

Figure 1:
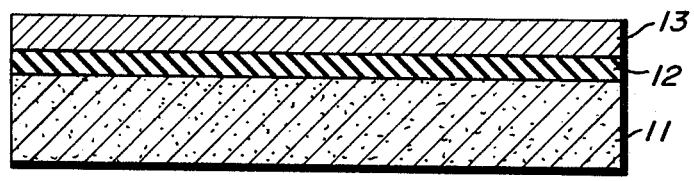
FIGS. 1 – 4 illustrate various steps in the manufacturing process of the sensor.

FIG. 1 illustrates, in the preferred embodiment, a monocrystalline silicon substrate support member 11 with a layer of silicon nitride 12, 4K A – 5K A in thickness, over the top surface. A layer 13 of polycrystalline silicon, 4 – 6 microns thick is shown having been deposited over the silicon nitride layer 12.

Figure 2:
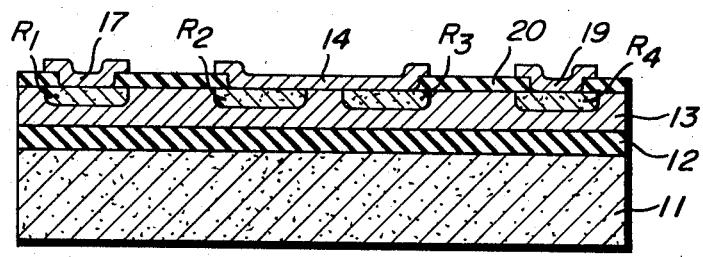

FIG. 2 illustrates a bridge comprised of resistors R1, R2, R3 and R4 having been diffused into polycrystalline layer 13. R2 and R3 are located over an area that will ultimately be flexible and are piezoresistive pressure sensitive elements. R1 and R4 are resistive elements that are pressure insensitive. In this preferred embodiment, the diffusion is made using boron to produce a P conductivity type region for each of the resistors R1 – R4 and the polycrystalline silicon layer 13 of an N conductivity type material. Depending upon the particular characteristics desired, these conductivities could be reversed. The pressure sensitive elements R2 and R3 and the pressure insensitive elements R1 and R4 are formed in a well known manner using photoresist techniques which involves making a mask of the pattern desired and then going ahead with the diffusion as stated above. It should be realized that ion implantation is a technique that also could be used to form elements R1 – R4. Metallization 17, 14 and 19 is laid down in the desired pattern, by well known techniques, to form a balanced bridge wherein R2 and R3, as the pressure sensitive elements, react to pressure resulting in an imbalance of the bridge.

Figure 3:
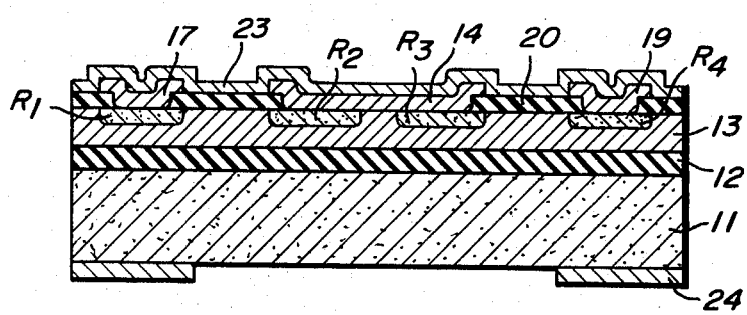

Silicon nitride is deposited on both sides of the device and the lower side of the wafer is patterned in a conventional way so that the silicon nitride forms an etch mask 24 as illustrated in FIG. 3. The silicon nitride layer 23 is a protective layer for a subsequent etch using KOH. This protective step could also have been done by inserting the top of the device into wax.

Figure 4:
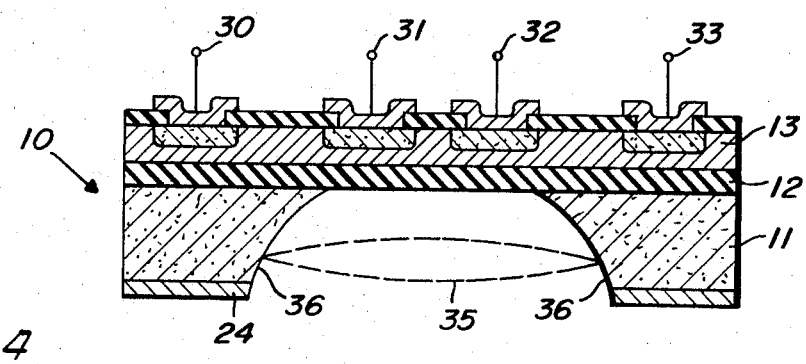

FIG. 4 illustrates the device after the protective layer of silicon nitride 23 has been removed, and after the KOH etch, leaving the flexible center section indicated by dimension 35. Terminals 30, 31, 32 and 33 are shown as having been added.

Figure 5:
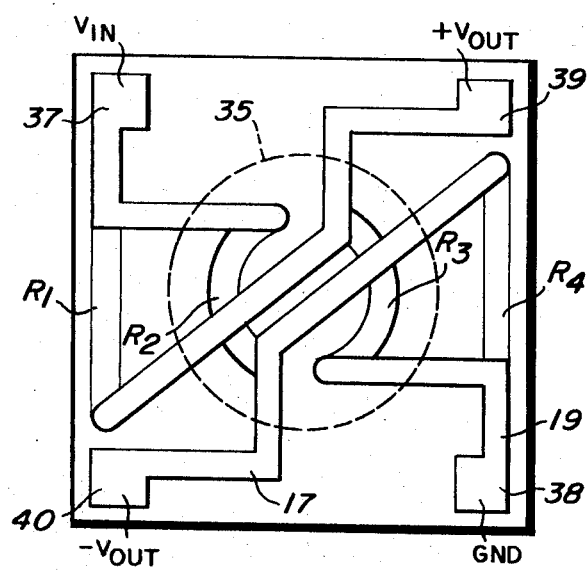
FIG. 5 is a plan view of an embodiment of the invention involving a pair of pressure sensitive elements and a pair of pressure insensitive elements, forming a balanced bridge.

FIG. 5 is a plan view of the device showing piezoresistive pressure sensitive elements R2 and R3 formed within the area of the flexible center section 35. Pressure insensitive elements R1 and R4 are shown formed in the peripheral section 36.

Figure 6:
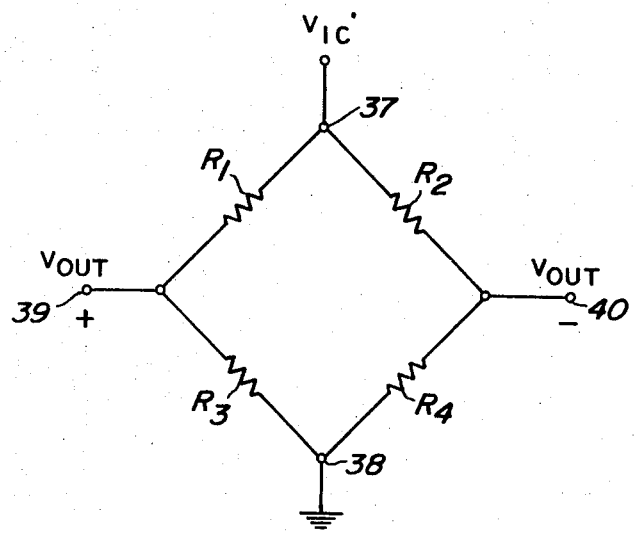
FIG. 6 is a schematic diagram of the balanced bridge.

FIG. 6 schematically illustrates that $V_{in}$ is applied to terminals 37 and 38 and $V_{out}$ is taken from terminals 39 and 40. When R2 and R3 are not subjected to pressure, $V_{out}$ is equal to 0 by proper selection of resistance. When R2 and/or R3 are deflected by pressure, the resistance changes and $V_{out}$ is no longer 0. The finished balance bridge of FIG. 4 and FIG. 5 illustrate a bridge having pressure sensitive elements with high gage factors, and with the extremely desirable feature of ease of fabrication. The bridge of this preferred embodiment does not, of course, limit the applications to which this invention may be put. Certainly a single piezoresistive pressure sensitive element application is useful as are other combinations of pressure sensitive and pressure insensitive devices.

We claim:

1. A polycrystalline silicon pressure sensor comprising:
  a. a substrate support member having a flat upper surface, a flexible inner section, and a rigid peripheral section, relatively thick compared with the flexible section, downwardly disposed to form a support for the flexible section, the member being of a material on which polycrystalline silicon is capable of being deposited;
  b. a first layer of polycrystalline silicon formed over the flat upper surface, sufficiently thin to enable flexing with the flexible inner section of the member; and
  c. at least one piezoresistive pressure sensitive element of a first conductivity type, formed through the top surface of the first layer over the flexible inner section and extending to the peripheral section.

2. The sensor of claim 1 wherein the flexible section of the support member further comprises an etch stop layer, extending laterally into the peripheral section and being contiguous therewith.

3. The sensor of claim 2 wherein the support member is comprised of monocrystalline silicon and the etch stop layer is a $P^+$ conductivity type region.

4. The sensor of claim 3 further comprising:
  d. at least one pressure insensitive element of the first conductivity type, formed through the top surface of the first layer over the peripheral section, electrically connected to the pressure sensitive element.

5. The sensor of claim 4 wherein there are two pressure sensitive elements and two pressure insensitive elements, electrically connected to form a bridge circuit for producing an output from an imbalance caused by pressure being exerted against the pressure sensitive elements.

6. The sensor of claim 5 wherein the pressure sensitive and pressure insensitive elements are formed within the member as P conductivity type regions.

7. The sensor of claim 1 wherein the flexible section of the support member further comprises an insulating, etch stop layer formed over the peripheral section, the top surface of the insulating layer being the flat upper surface.

8. The sensor of claim 7 wherein the support member is comprised of monocrystalline silicon and the insulating etch stop layer is comprised of silicon nitride.

9. The sensor of claim 8 further comprising:

d. at least one pressure insensitive element of the first conductivity type, formed through the top surface of the first layer, over the peripheral section, electrically connected to the pressure sensitive element.

10. The sensor of claim 9 wherein there are two pressure sensitive elements and two pressure insensitive elements, electrically connectecd to form a bridge circuit for producing an output from an imbalance caused by pressure being exerted against the pressure sensitive elements.

11. The sensor of claim 10 wherein the pressure sensitive and pressure insensitive elements are formed within the first layer as P conductivity type regions.

* * * * *